United States Patent
Hasegawa et al.

(10) Patent No.: US 10,620,865 B2
(45) Date of Patent: Apr. 14, 2020

(54) WRITING FILES TO MULTIPLE TAPES

(71) Applicant: International Business Machines Corporation, Armonk, NY (US)

(72) Inventors: Tohru Hasegawa, Tokyo (JP); Hiroshi Itagaki, Yokohama (JP); Tsuyoshi Miyamura, Yokohama (JP); Shinsuke Mitsuma, Tokyo (JP); Sosuke Matsui, Tokyo (JP); Noriko Yamamoto, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 14 days.

(21) Appl. No.: 15/988,044

(22) Filed: May 24, 2018

(65) Prior Publication Data
US 2019/0361622 A1 Nov. 28, 2019

(51) Int. Cl.
*G06F 3/06* (2006.01)
*G06F 16/18* (2019.01)

(52) U.S. Cl.
CPC .......... *G06F 3/0643* (2013.01); *G06F 3/0611* (2013.01); *G06F 3/0659* (2013.01); *G06F 3/0682* (2013.01); *G06F 3/0686* (2013.01); *G06F 16/18* (2019.01); *G06F 2212/213* (2013.01)

(58) Field of Classification Search
CPC .... G06F 3/0648; G06F 3/0611; G06F 3/0659; G06F 3/0682; G06F 3/0686; G06F 16/18
USPC .......................................................... 711/103
See application file for complete search history.

(56) References Cited

U.S. PATENT DOCUMENTS

| | | | |
|---|---|---|---|
| 9,275,678 B2 * | 3/2016 | Amir | G11B 23/042 |
| 9,830,085 B1 | 11/2017 | Hasegawa et al. | |
| 9,946,487 B2 * | 4/2018 | Hasegawa | G06F 16/185 |
| 2012/0054428 A1 * | 3/2012 | Butt | G06F 3/061 |
| | | | 711/111 |
| 2013/0132663 A1 | 5/2013 | Eleftheriou et al. | |
| 2014/0025911 A1 * | 1/2014 | Sims | G06F 3/065 |
| | | | 711/162 |
| 2014/0358871 A1 * | 12/2014 | Cideciyan | G06F 16/1748 |
| | | | 707/692 |
| 2015/0113216 A1 | 4/2015 | Butt et al. | |
| 2016/0117259 A1 | 4/2016 | Hasegawa et al. | |

(Continued)

FOREIGN PATENT DOCUMENTS

JP  6242326 B2  12/2017

OTHER PUBLICATIONS

"Data Storage Solutions", The Hierarchical Storage Management (HSM) System, © Copyright 2017 by the Rector & Board of Visitors of the University of Virginia, Page Updated: Friday Mar. 6, 2015 14:59:19 EST, 5 pages, <http://its.virginia.edu/hosting/storage/hsm.html#intro>.

(Continued)

*Primary Examiner* — Pierre Miche Bataille
(74) *Attorney, Agent, or Firm* — Gilbert Harmon, Jr.

(57) ABSTRACT

The direction of a WRAP and the logical points on which a file are written influence the efficiency of a recall of the file. Embodiments of the present invention provide methods and systems which can be applied to an upper storage layer and a lower storage layer in a hierarchical storage system. In turn, the migration and recall of a plurality of files, which contain data, are more rapid and efficient by preferring one logical point over another logical point.

20 Claims, 6 Drawing Sheets

(56) References Cited

U.S. PATENT DOCUMENTS

| | | |
|---|---|---|
| 2016/0139824 A1 | 5/2016 | Hasegawa et al. |
| 2017/0046351 A1 | 2/2017 | Hasegawa et al. |
| 2017/0131940 A1 | 5/2017 | Hasegawa et al. |
| 2018/0059959 A1 | 3/2018 | Hasegawa et al. |
| 2018/0059960 A1 | 3/2018 | Hasegawa et al. |
| 2018/0059961 A1 | 3/2018 | Hasegawa et al. |
| 2018/0314422 A1* | 11/2018 | Gong .................... G06F 3/0647 |
| 2019/0340131 A1* | 11/2019 | Miyamura .......... G06F 12/0891 |

OTHER PUBLICATIONS

"IBM TS3500 Tape Library", A highly scalable, automated tape solution to address data protection and long-term retention, Sep. 1, 2017, 3 pages, <https://www.ibm.com/us-en/marketplace/ts3500/details#product-header-top>.

"LTFS Enterprise Edition components", IBM Knowledge Center, 3 pages, <https://www.ibm.com/support/knowledgecenter/ST9MBR_1.1.0/com.ibm.storage.hollywood.doc/ltfs_ee_components.html>.

Appendix P—List of IBM Patents or Patent Applications Treated as Related, Filed herewith, 2 Pages.

* cited by examiner

WRITING FILES TO MULTIPLE TAPES

BACKGROUND OF THE INVENTION

The present invention relates generally to the field of data migration and more specifically to managing a plurality of files on a tape.

The Linear Tape File System (LTFS) is a standard format for storing files and accessing tapes via a file system. LTFS stores data on a tape cartridge according to a mode in compliance with the LTFS format. Vendors are involved in the development of software that realizes access to a tape conforming to the LTFS format via the interface of the file system. There are existing products which incorporate LTFS technology. However, there are instances when an application, for which use of hard disk drive (HDD) is assumed, actually operates by using LTFS without modifying the application. In these instances, access to a file takes more time than expected. Thus, the application may lead to a "time-out" for accessing the file. In order to prevent such a situation, Hierarchical Storage Management (HSM) in which high-speed storage (e.g., a HDD or a solid-state drive (SSD)) is used as a primary storage. Additionally, LTFS is used as a secondary storage, which may be configured without directly using files in the LTFS.

SUMMARY

According to one embodiment of the present invention, a method for managing a plurality of files is provided. The method involves: managing, by one or more processors, a plurality of files; migrating, by one or more processors, the plurality of files stored in a first storage site to a plurality of tapes in a second storage site in a hierarchical storage system, wherein each tape of the plurality of tapes includes a first position and a second position; calculating, by one or more processors, a recording position of each file of the plurality of files on respective tapes, wherein the recording position is either the first position or the second position of the respective tapes; determining, by one or more processors, a writing order of the plurality of files based on respective recording positions for each file contained on respective tapes; and recording, by one or more processors, each file of the plurality of files on a respective tape of the plurality of tapes based, at least in part, on the writing order.

Another embodiment of the present invention provides a computer program product for managing a plurality of files, based on the method above.

Another embodiment of the present invention provides a computer system for managing a plurality of files, based on the method above.

DETAILED DESCRIPTION

Figure 1:
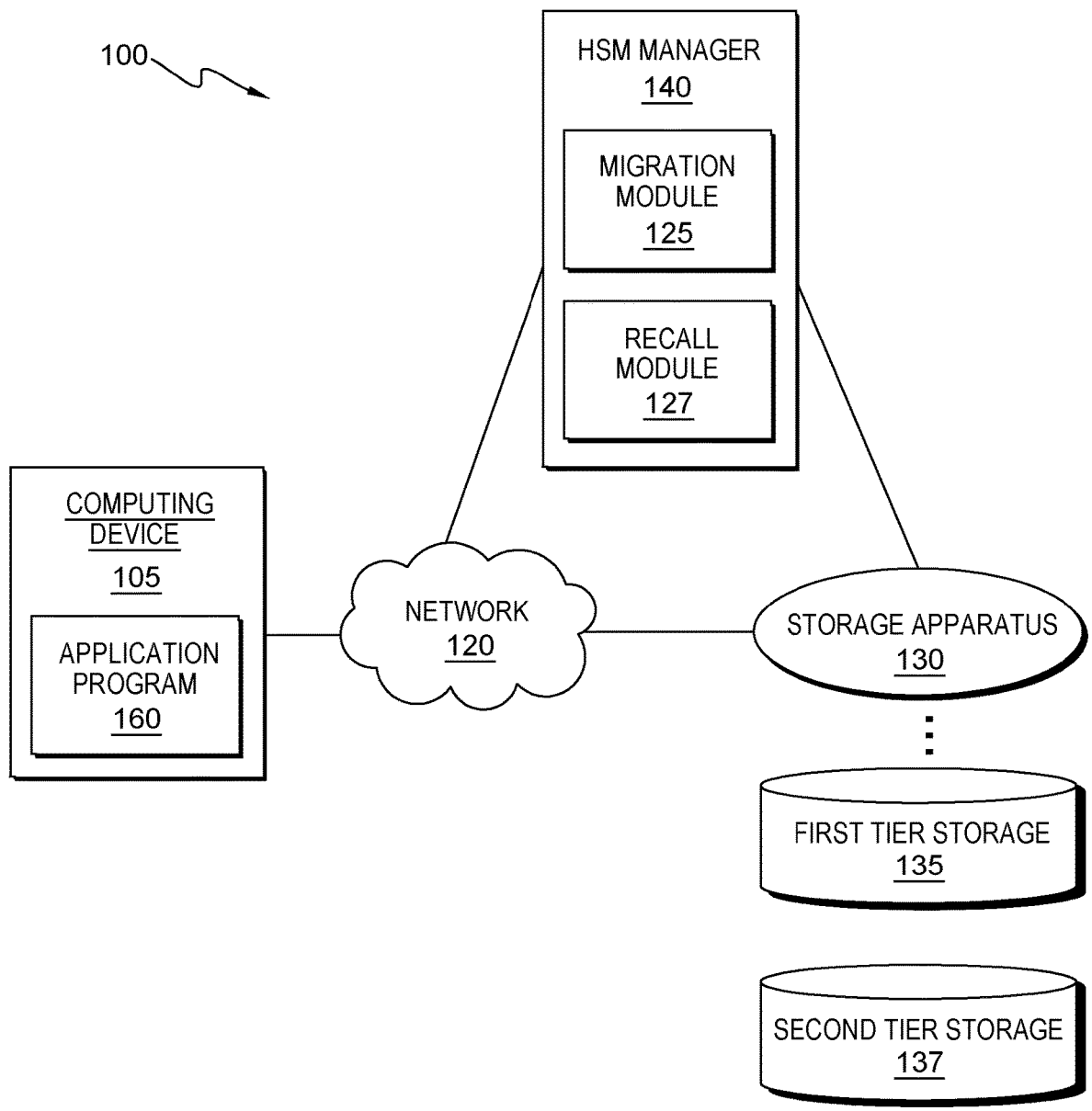
FIG. 1 is a functional block diagram illustrating a hierarchical storage system, in accordance with an embodiment of the present invention.

Instead of directly using files on the product incorporating LTFS, a hierarchical storage management (HSM) may be configured as a high-speed storage with primary storage and secondary storage. HDD and SSD serve as the primary storage. The products incorporating LTFS serve as the secondary storage. Another type of product utilizes HSM in conjunction with LTFS, wherein only HDD is the primary storage and the product incorporating LTFS is the second storage. Data is written on tapes of the linear tape-open (LTO) system within LTFS. A tape is selected for reading and recalling a file written on multiple tapes. In some instances, the multiple tapes are non-mounted. Locating the head positioning of a file may take on the scale of minutes, which is a non-negligible time when reading or recalling a file. This occurs because data is written on a tape of LTO, while: (i) being reciprocating in the longitudinal direction of the tape at different times; and (ii) the tape contains logical points LP3 and LP4. One-way in the longitudinal direction is referred to as a WRAP. If the size of multiple files exceeds one WRAP during the migration to multiple tapes, the files are written on the multiple tapes while changing the file writing order among the tapes. In turn, each of the files are prevented from being written near part of LP3 over all the tapes. Furthermore, when a file is written on multiple tapes only near part of LP4 over all the tapes, the head movement of the file takes a longer time irrespective of a selected tape during recall operations. Thus, the efficiency and speed of the recall of a plurality of files are impeded when written near LP4.

Embodiments of the present invention disclose methods and systems to migrate files for increasing speed of recalling of a plurality of files stored in an upper storage layer from a lower tape layer in a hierarchical storage system. For example, files 1 and 2 are written onto tapes 1 and 2 upon migrating files 1 and 2 to tapes 1 and 2. It is subsequently determined if the direction of WRAPs of files 1 and 2 are changed. If the direction of WRAP of file 1 does not change and the direction of the WRAP of file 2 does change, then the order is calculated, where files 1 and 2 are written to tape 2. In this example, the embodiments of the present invention lead to instances of: (i) changed writing orders of files; (ii) archived rapid recall; and (iii) prevention of writing each file near part of LP4 over all tapes when files exceeding one WRAP are migrated and written on the tape, while the writing order is changed. Without the embodiments of the present invention, files 1 and 2 are written onto tape 1 upon migrating files 1 and 2 to tapes 1 and 2, while simultaneously writing files 1 and 2 onto tape 2.

The present invention will now be described in detail with reference to the Figures. FIG. 1 is a functional block diagram illustrating a hierarchal storage system, generally designated 100, in accordance with one embodiment of the present invention. FIG. 1 provides only an illustration of implementation and does not imply any limitations with regard to the environments in which different embodiments may be implemented. Modifications to data processing environment 100 may be made by those skilled in the art without departing from the scope of the invention as recited by the claims. In this exemplary embodiment, data processing environment 100 includes: storage apparatus 130 and computing device 105 connected by network 120.

Network 120 can be, for example, a local area network (LAN), a wide area network (WAN) such as the Internet, or a combination of the two, and can include wired, wireless, or fiber optic connections. In general, network 120 can be any combination of connections and protocols that will support communication between computing device 105 and storage apparatus 130.

Computing device 105 includes application program 160. Computing device 105 may be a laptop computer, a tablet computer, a netbook computer, a personal computer (PC), a desktop computer, a personal digital assistant (PDA), a smart phone, a thin client, or any programmable electronic device capable of communicating with storage apparatus 130. Computing device 105 may include internal and external hardware components, as depicted and described in further detail with respect to FIG. 6.

In an exemplary embodiment, application program 160 resides within computing device 105. Application program 160 is a collection of machine readable instructions and/or data which is used to create, manage, and control certain functions/operations of a computing system. In this exemplary embodiment, application program 160 is a user application which works in conjunction with HSM Manager 140. HSM Manager 140 resides in a storage environment, such as storage apparatus 130. Furthermore, HSM Manager 140 is a HSM management software which handles migration functions/operations (via migration module 125) and recall functions/operations (via recall module 127) without notifying a user application, such as application program 160. In this exemplary embodiment, migration module 125 and recall module 127 reside within HSM Manager 140.

In an exemplary embodiment, HSM Manager 140 invokes migration module 125 and recall module 127 to manage data migration within HSM. HSM is a data storage technique, which automatically moves data between higher cost and lower cost storage media, as applied by LTFS. Higher-speed storage devices (e.g., hard disk drive arrays) are more expensive per byte stored than slower-speed storage devices (e.g., optical discs and tape drives). In an ideal situation, data is stored and is available on high-speed devices at all times. However, this may be prohibitively expensive for many organizations. Instead, HSM systems store the bulk of the enterprise's data on slower-speed storage devices and then copy data to higher-speed disk drives when needed. In effect, HSM turns the fast disk drives into caches for the slower-speed mass storage devices. The HSM system monitors the way data is used while determining which data can safely be moved to slower-speed devices and which data should stay on the higher-speed devices.

In an exemplary embodiment, migration module 125 facilitates the selection of a tape which allows for migration when the file is written into a plurality of tapes (e.g., multiple units of tape 150). In turn, recall module 127 facilitates the selection of a tape which allows for recall when the file is written into a plurality of tapes. The quickest recall is a recall which requires the shortest span of time to process the recall request and select the appropriate tape to complete the recall request. Migration module 125 and recall module 127 of HSM Manager 140 manage storage apparatus 130. Migration module 125 is performed on a system containing: tiered storage levels (e.g., first tier storage 135 and second tier storage 137), a tape library, a file, and a stub file (which results from migrating the file). Migration module 125 migrates a plurality of files stored in an upper storage layer to a plurality of tapes in a lower tape layer in a hierarchical storage system. This is accomplished by migration module 125 performing the following functions: (i) writing files to a first tape; (ii) obtaining the recording positions on the first tape; (iii) obtaining the positions from all tapes where the migration of the file has been completed; (iv) choosing a position from the tapes nearest to LP3 to be used for recall; (v) determining a writing order based on the position of files positioned nearest to LP3; (vi) writing the files into tape(s) in the determined writing order; and (vii) iteratively performing steps (iii)-(vi). Upon migration module 125 receiving a command from HSM Manager 140 for migrating a certain number of files, migration module 125 performs the following functions: (i) successively and physically writing the certain number of files onto a first tape; (ii) specifying files that have been physically written as the plurality of files, until a WRAP direction changes during writing operations; and (iii) iteratively executing the calculating, the determining, and the recording steps on the remaining tapes for the specified plurality of files. The actual WRAP direction and actual changes in the WRAP directed can detected by migration module 125 checking the physical position of the tape. If target files for migration remain, migration module 125 writes data while executing the calculating, the determining and the recording steps on the remaining files. Subsequently, migration module 125 forms a stub file of a file migrated from a lower tape layer to an upper storage layer. The functions performed by migration module 125 are described in more detail with respect to FIGS. 2-5 below.

Storage apparatus 130 provides a storage environment by implementing tiered data storage within HSM. Storage apparatus 130 is connected to computing device 105. In an exemplary embodiment, storage apparatus 130 allows the automated progression or demotion of data across different tiers (types) of storage devices and media. The movement of data takes place in an automated fashion with the aid of software (i.e., application program 160 and HSM Manager 140) or embedded firmware, as assigned to the related media according to performance and capacity requirements. Implementations vary but are classed into two broad categories: (i) pure software based implementations, which are run on general purpose processors supporting most forms of general purpose storage media (e.g., magnetic disks, tapes, and optical tapes); and (ii) embedded automated tiered storage, which is controlled by firmware as part of a closed embedded storage system (e.g., storage area network (SAN) disk array). Software Defined Storage architectures commonly include a component of tiered storage as part of their primary functions.

First tier storage 135 and second tier storage 137 are components of the storage environment provided by storage apparatus 130. First tier storage 135 is the highest level of performing systems when implementing tiered data storage; and second tier storage 137 is a lower level of performing systems when implementing tiered data storage (e.g., LTFS library edition consisting of a computer system and tape library). The most accessed data is stored within first tier storage 135, while less accessed data is stored within second tier storage 137. HSM checks the access time of each file and subsequently migrates the least accessed/used files to second tier storage 137. Data is migrated and recalled between first tier storage 135 and second tier storage 137. In an exemplary embodiment, migration module 125 works in conjunction with recall module 127 to facilitate more efficient recall of files from second tier storage 137. In this exemplary embodiment, first tier storage 135 is HDD and second tier storage 137 is a type of LTFS (which will be described in further detail with respect to the discussion of FIG. 2).

In currently-implemented LTFS, the record number on a tape is used to access a file on the tape. The record number is an ordered sequence reflecting an instance or version of a record. In some embodiments, the record number is represented by alpha numeric characters. In other embodiments, the record number is represented by symbols. For example, the record number is a sequence number of records in a tape (e.g., $10^{th}$ record, $150^{th}$ record, and $1000^{th}$ record). A tape drive, which accepts an access request specifying a record number, converts the record number to a physical position on the tape to perform the access. Therefore, second tier storage 137 (e.g., LTFS) does not recognize the physical position on the tape. In some embodiments, LP3 and LP4 are the physical positions of the tape. LTFS can acquire the position of the file on the tape as a WRAP number and longitudinal position (LPOS) from the tape drive. The WRAP number is the position in the tape width direction and LPOS is the position in the tape length direction.

In an exemplary embodiment, second tier storage 137 (e.g., LTFS) does not recognize the physical positions of the record numbers, while obtaining the physical positions of record number subsequent to writing records via an interface (which is not depicted in FIG. 1). In an exemplary embodiment, a tape drive (which is not depicted in FIG. 1) performs the following functions: (i) recognizing the physical positions of the record numbers, wherein the tape drive contains a memory buffer while writing data asynchronously onto a tape; (ii) predicting the physical positions of the record numbers when the tape drive stores the data in memory; and (iii) providing an interface (which is not depicted in FIG. 1) to obtain a physical positions of the record numbers.

Storage apparatus 130 includes a memory buffer (which is not depicted in FIG. 1). When writing data on a tape, storage apparatus 130 inputs the data into the memory buffer and notifies application program 160 of completion of writing the data. Thereafter, the tape drive writes the data from the memory buffer onto the tape asynchronously with the writing operation of application program 160. Therefore, when LTFS writes data onto a tape, LTFS recognizes record numbers on the assumption that a record is appended to the tape after a record written finally on the tape while completing the writing at the time point of when data has been stored in the memory buffer of the tape drive.

In an exemplary embodiment, migration module 125 applies a prediction algorithm when writing file(s). More specifically, migration module 125 aids the tape drive in grasping the physical position of data (as contained within a file) which have been finally written on the tape. The prediction algorithm records prior writing directions and positions of files. Subsequently, prediction algorithm sets certain writing directions and positions of files as a baseline to compare other writing directions and positions of file in order to determine writing trends of the files. Thus, migration module 125 can predict, from the grasped physical position the following: (i) where data stored in the memory buffer is located on the tape (e.g., a location associated with the data); and (ii) when the data stored in the memory buffer will be written on the tape (e.g., a time associated with the data). In turn, an interface is provided for inquiring pertaining to the tape drive about the position on the tape (WRAP and LPOS) of data just stored in the memory buffer. More specifically, migration module 125 determines when all of the data stored in the memory buffer will be written on the tape, and whether the data writing direction is near or along LP3 or LP4. This interface may be incorporated into network 120 using transmission control protocol/internet protocol (TCP/IP) or the like, or an expanded small computer system interface (SCSI) command.

In an exemplary embodiment, storage apparatus contains magnetic tape(s). The magnetic tapes are not explicitly depicted in FIG. 1. An information storage medium is a magnetic coating on a flexible backing in tape form. Data is recorded by magnetic encoding of tracks on the coating according to a particular tape format. The magnetic tapes are wound on reels (or spools). The magnetic tapes may be: used on its own, used as an open-reel tape, or contained in some sort of magnetic tape cartridge for protection and ease of handling. For this purpose, interchangeable standards are of minor importance. Accordingly, proprietary cartridge-tape formats are widely used.

Figure 2:
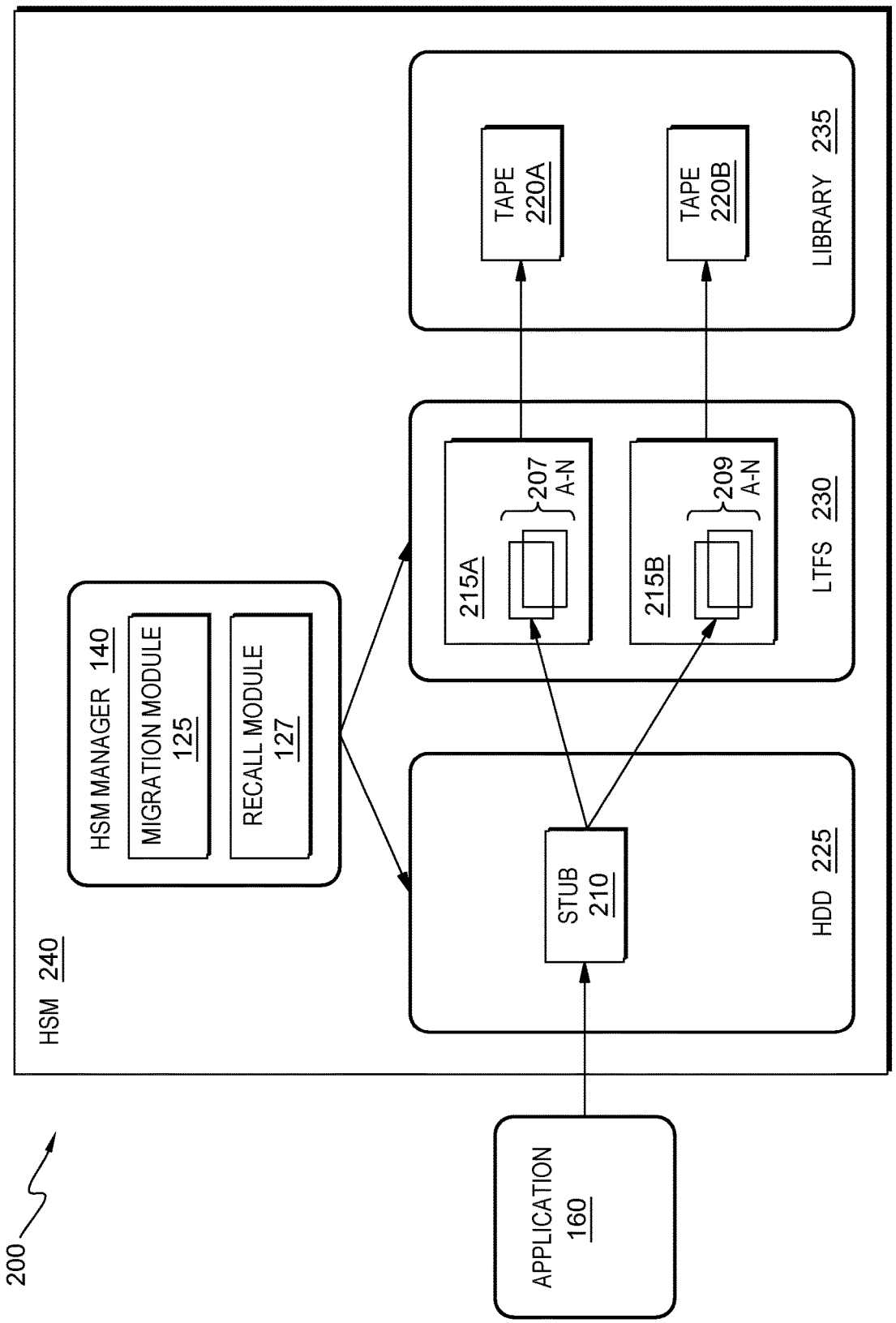
FIG. 2 is a functional block diagram depicting the migration of files, in accordance with an embodiment of the present invention.

FIG. 2 is a functional block diagram depicting the migration of files, in accordance with an embodiment of the present invention.

Environment 200 depicts the migration of files within a HSM system.

HSM systems are represented by HSM 240, wherein HSM 240 is a type of LTFS system. HDD 225 is the primary storage and LTFS 230 is the secondary storage. User application programs, such as application program 160 (from FIG. 1), initially store files 207A-N in HDD 225. Migration module 125 and recall module 127 reside in HSM 240 at HSM Manager 140. In an exemplary embodiment, files 207A-N are a cluster of multiple files residing in secondary storage. Files 209A-N are a different instance of files 207A-N residing in a secondary storage. Files 207A-N and 209A-N will be moved to LTFS 230 from HDD 225, which is the secondary storage, at a time when there is no access to the files 207A-N and 209A-N. Files 207A-N and 209A-N are contained within structures 215A and 215B, respectively. In some embodiments, HSM 240 stores information, such as a "stub file" for file 207A corresponding to the file in tapes 220A and 220B.

For example, LTFS 230 (e.g., LTFS LE) has directory structures when file 207A migrates from HDD 225 to LTFS 230. The directory structures of LTFS LE are listed below.

| | |
|---|---|
| mnt/lfts/TAPE220A | (LTFS Directory Structure 1) |
| mnt/lfts/TAPE220B | (LTFS Directory Structure 2) |

In this example, migration module 125 chooses a tape among tapes 220A and 220B and writes file 207A to tapes 220A and 220B. The directory structures of the tapes are listed below.

| | |
|---|---|
| mnt/lfts/TAPE220A/FILE207A | (Tape Directory Structure 1) |
| mnt/lfts/TAPE220B/FILE207B | (Tape Directory Structure 2) |

In an exemplary embodiment, a stub file is placed in the primary storage site (e.g., HDD 225) when files 207A-N and 209A-N are moved from HDD 225 to LTFS 230. HSM Manager 140 invokes migration module 125 to: generate the stub file on HDD 225 and store the information associated with a file (e.g., files 207A-N and 209A-N) in a database or in an extended attribute of the stub file. In this exemplary embodiment, the stub file is stub 210 which is a file indicative of the existence of one of the file among files 207A-N and 209A-N. A stub file should exist for each file, wherein the stub file is a computer file is immediately available for use while appearing to a user on a disk. The stub file is held either in part or entirely on a different storage medium. Upon accessing a stub file, the accessed file is intercepted by a device driver software. Data is retrieved from the actual location of the stub file, wherein the retrieved data is written to the stub file while allowing user access to the data. Even if there is a slight delay when accessing such a file, users are typically unaware that the data within a stub file is stored on a different medium. The purpose of stub files is to move data from an expensive higher-speed storage device (e.g., a computer's hard drive) to a cheaper lower-speed storage device (e.g., a tape or an electro-optical disk) while not requiring the knowledge of using specialized storage software to retrieve the data. Thus, stub files allow a system manager to enforce the use of cheaper storage when users would prefer to store files on higher cost devices. Stubbing is a feature of some commercial file backups, archiving packages, and operating systems.

The operation of moving files 207A and 209A from primary storage to secondary storage followed by the subsequent creation of stub 210 is referred to as "file migration." As a response to accessing stub 210, files 207A or 209A are read from LTFS 230 (i.e., the secondary storage) and moved to HDD 225 (i.e., the primary storage). The operation to read file 207A or 209A from the secondary storage (i.e., LTFS 230) and move to the primary storage (i.e., HDD 225) is referred to as "file recall."

When LTFS 230 is used as the secondary storage in HSM 240, the access to the data deriving from files 207A and 209A occurs at stub 210 in HDD 225. To successfully perform the recall operation, recall module 127 is required to identify the tape (e.g., tapes 220A and 220B among tape library 235) in which files 207A and 209A are stored. In view of this, HSM 240 is configured to record the correspondence between stub 210 and the tape in which the file body is stored. The methods of recording this correspondence may include: (i) storing a tape identity (ID) as one of the file attributes of stub 210 or (ii) providing a database dedicated to HSM 240 and recording the correspondence therein. In an exemplary embodiment, the correspondence involves storing the tape ID as one of the file attributes of stub 210. The tape ID is an identification uniquely assigned to the tape. In general, where HSM 240 utilizes LTFS 230 as the secondary storage, the migration of files 207A-N and 209A-N may involve a plurality of tapes (e.g., tape library 235 containing tapes 220A and 220B). Each of files among files 207A-N and 209A-N may migrate and be recalled to and from tapes 220A and B. The tape ID of these files allows recall module 127, as invoked by HSM Manager 140, to identify each of file among files 207A-N and 209A-N for recall operations.

In an exemplary embodiment, HSM Manager 140 invokes migration module 125 to migrate files to multiple tapes. For example, migration module 125 migrates files 207A-N to tape 220A and tape 220C (which is not depicted in FIG. 2) and files 209A-N to tape 220B and tape 220D (which is not depicted in FIG. 2). Stated another way, the first group of files (files 207A-N), which resided in structure 215A, are migrated to tapes different from the tapes for the second group (files 209A-N), which resided in structure 215B.

In some embodiments, HSM 240 uses LTFS 230 as the secondary storage. Accordingly, when an access to stub 210 on HDD 225 as primary storage occurs for performing recall operations, HSM Manager 140 necessarily invokes migration module 125 in order to specify a tape, among tapes 220A-B, on which a file, among files 207A-N and 209A-N, is stored. Therefore, migration module 125 records, in HSM 240, the association between stub 210 and a tape among tapes 220A-B. The main body of a file, among files 207A-N and 209A-N, is stored on tapes 220A-B. In some embodiments, the method of recording the association includes: (i) storing tape ID as one of the file attributes of stub 210; (ii) equipping HSM 240 with a database (which is not depicted in FIG. 2); (iii) recording the association in the database; and (iv) allocating a tape ID uniquely to a tape among tapes 220A-B. In some embodiments, file 207A and file 209A indicate that there are two copies of file A, where the data of file 207A is stored in tape 220A; and the data of file 209A is stored in tape 220B. This has an effect of preparing against damage of tapes by storing one file on multiple tapes. If there are three copies of file A, file 207A; file 209A; and file 211A are in LTFS 230, where the data of file 207A is stored in tape 220A; the data of file 209A is in tape 220B; and the data of file 211A is in tape 220C. File 211A and tape 220C are not depicted in FIG. 2.

Linear-tape open (LTO) is a magnetic tapa data storage used with small and large computer systems. There are different generations of LTO, such as LTO-1; LTO-2; LTO-3; LTO-4; LTO-5; LTO-6; LTO-7; and LTO-8. Migration module 125 and recall module 127 of HSM Manager 140 are compatible with the different generations of LTO. LTO-1 is characterized as having a raw data capacity of 100 gigabytes (GB); maximum uncompressed speed of 20 megabytes (MB)/second (s); and no partitions. LTO-2 is characterized as having a raw data capacity of 200 GB; maximum uncompressed speed of 40 MB/s; and no partitions. LTO-3 is characterized as having a raw data capacity of 400 GB; maximum uncompressed speed of 80 MB/s; and no partitions. LTO-4 is characterized as having a raw data capacity of 800 GB; maximum uncompressed speed of 120 MB/s; and no partitions. LTO-5 is characterized as having a raw data capacity of 1.5 terabytes (TB); maximum uncompressed speed of 140 MB/s; and 2 maximum partitions. LTO-6 is characterized as having a raw data capacity of 2.5 TB; maximum uncompressed speed of 160 MB/s; and 4 maximum partitions. LTO-7 is characterized as having a raw data capacity of 6.0 TB; maximum uncompressed speed of 300 MB/s; and 4 maximum partitions. LTO-8 is characterized as having a raw data capacity of 12 TB; maximum uncompressed speed of 360 MB/s; and 4 maximum partitions.

In an exemplary embodiment, enterprise edition is a type of LTFS 230 designed for a recall operation of a file, among files 207A-N and 209A-N, which has been written in multiple tapes. In this exemplary embodiment, the recall operation is started from a tape, among tapes 220A-C, where the tape has been already mounted by a tape drive. This recall operation is executed when a file, among files 207A-N and 209A-N, where application program 160 requests a file wait for completion of the recall operation. Therefore, less time is required (i.e., a time scale less than the minute scale) to perform the recall operation by recall module 127, as invoked by HSM Manager 140. In an exemplary embodiment, LTFS 230, which contains HSM Manager 140, uses LTO-7. In this exemplary embodiment, HSM Manager 140 invokes migration module 125 and recall module 127 where a migration and subsequent recall can be performed in under 100 seconds. In other embodiments, LTFS 230, which contains HSM Manager 140, uses other LTO(s), wherein HSM Manager 140 invokes migration module 125 and recall module 127 to perform migration and subsequent recall operations. In these other embodiments, the nature of the LTO(s) dictates the amount of time needed to perform the migration and the subsequent recall operations using migration module 125 and recall module 127 of HSM Manager 140.

In an exemplary embodiment, tapes 220A-C are used by using a tape library. In this exemplary embodiment, the number of the tapes is generally larger than the number of tape drives. Therefore, instances where archived files are read out, are written on non-mounted tapes are read out. (For example, in the case of TS3500™ version of LTFS 230, the maximum number of tapes per library is equal to 15000, whereas the maximum number of tape drives per tape library is equal to 192.) Instances where HSM Manager 140 does not contain/incorporate migration module 125 with recall module 127, the migration and recall of files, among files 207A-N and 209A-N, are not as efficient as instances where application program 160 works in conjunction with migration module 125 and recall module 127. When invoked by HSM Manager 140 and working in conjunction with application program 160, migration module 125 controls the location where the migration of a file occurs. When invoked by HSM Manager 140 and working in conjunction with application program 160, recall module 127 controls the location where the recall of a file occurs.

Figure 3:
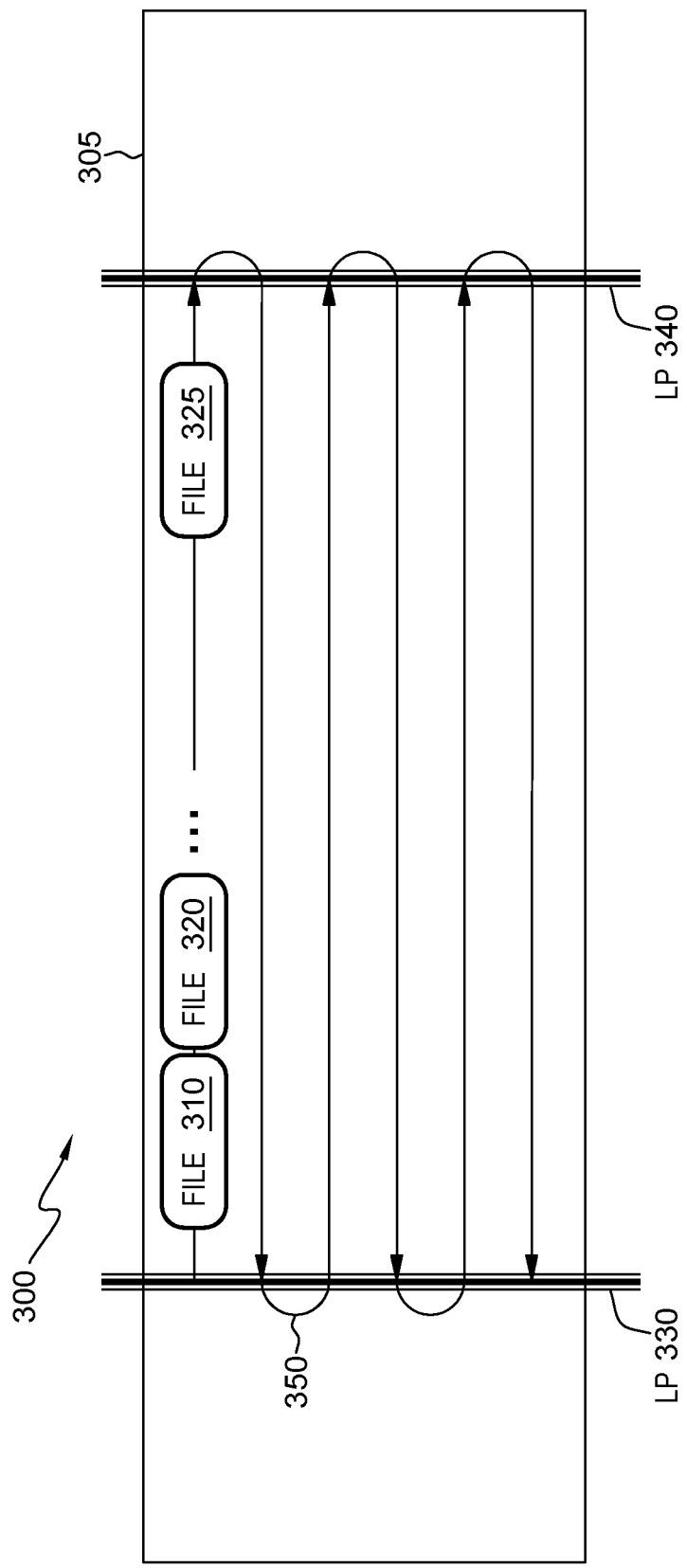
FIG. 3 is a diagram depicting the location of data on a tape, in accordance with an embodiment of the present invention.

FIG. 3 is a block diagram depicting the location of data on a tape, in accordance with an embodiment of the present invention.

Environment 300 is a tape environment containing tape 305. The location of positions in tape 305 are logical points (LP). Migration module 125 assists application program 160 in performing recall operations more efficiently by selecting a tape (e.g., tapes 220A-C) having the file on which the head of the tape is selectively/preferably directed towards one logical point over another logical point. In an exemplary embodiment, LP3 is the preferred logical point over LP4. Recalls from LP4 take longer to execute than recall from LP3. This is attributed to the head of the tape drive takes longer to move from LP3 to LP4. In this exemplary embodiment, LP3 is associated with LP 330 and LP4 is associated with LP 340. Along path 350, files 310, 320, and 325 are contained within tape 305. Files 310, 320, and 325 are similar or identical to files 207A-N and 209A-N.

The time required to position a head of the tape drive relative to the location in the tape where the file resides is dependent on the location of the file in the tape. In an exemplary embodiment, LTFS 230 uses LTO-1. In this exemplary embodiment, the head of the tape drive travels back and forth in the depicted WRAP direction in FIG. 3 (i.e., path 350) of tape 305 several times when data is written in tape 305, wherein tape 305 is an LTO-1 tape. In another exemplary embodiment (not depicted in FIG. 3), LTFS 230 uses LTO-5, which contains 80 WRAPs. In yet another exemplary embodiment (not depicted in FIG. 3), LTFS 230 uses LTO-7, which contains 112 WRAPs As a result, a file that has been written starting from the location near LP 330 during the commencement of data writing processes, requires a relatively short time for seeking after mounting tape 305. Thus, reading this type of file can be started within a short time during the commencement of data reading processes. In contrast, a file that has been written starting from a location near LP 340, which is a returning position at the end side in the WRAP direction of tape 305, requires a relatively long time for seeking. For example, file 310 is written at a location near LP 330 and file 325 is written at a location near LP 340. If the head of the tape drive is positioned near LP 330, then reading of file 310 can start immediately. Meanwhile, the reading of file 325 will require a longer time for positioning the head of the tape drive near LP 340.

Figure 4:
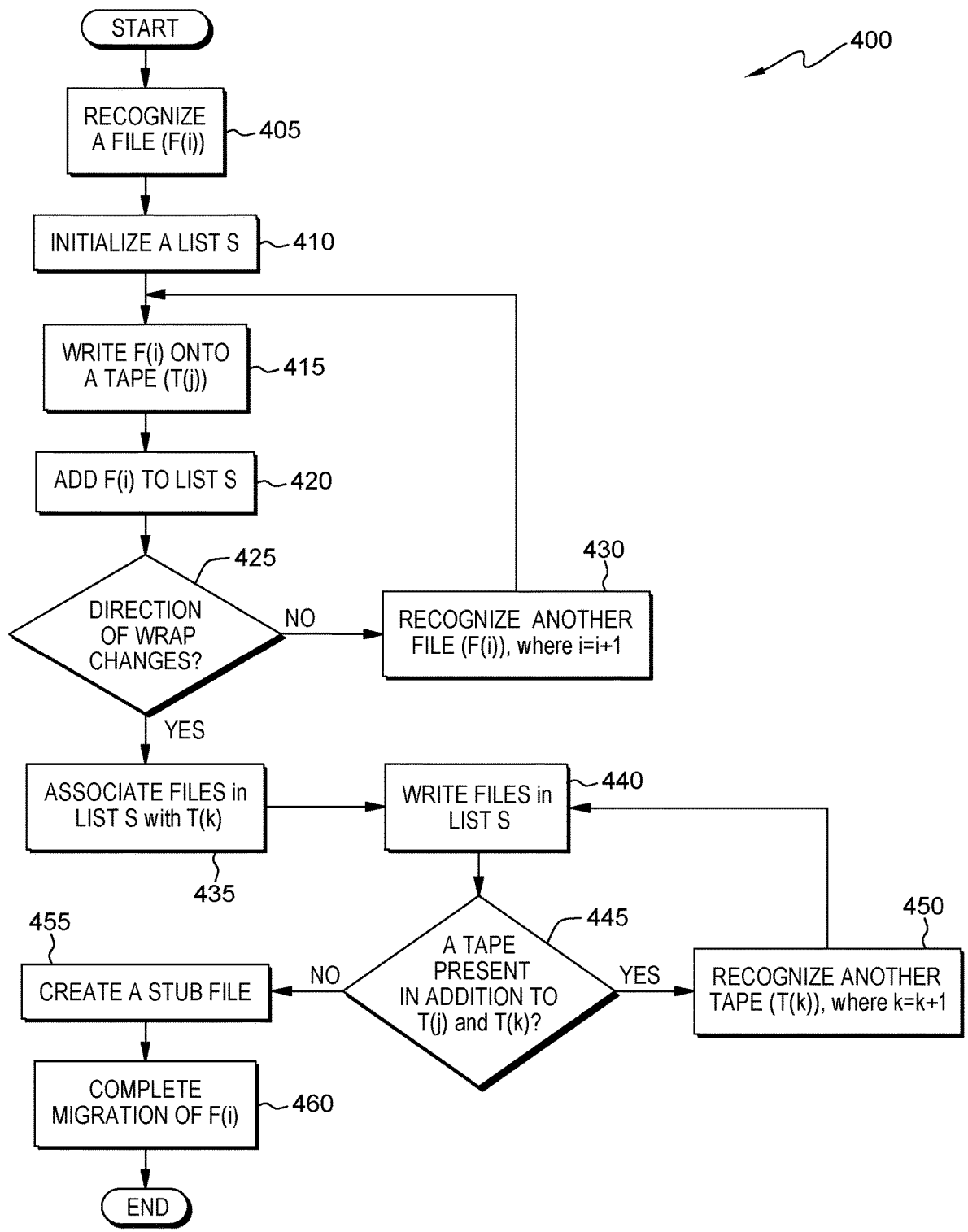
FIG. 4 is a flowchart detailing the operational steps of migrating a file, in accordance with an embodiment of the present invention.

FIG. 4 is a flowchart detailing the operational steps of migrating a file, in accordance with an embodiment of the present invention.

In general, two protocols are adopted in HSM products when files are migrated to multiple tapes. A first protocol is a method of grouping multiple tapes and storing the same file on the grouped tapes resembling a mirroring technique. As a result of this first protocol, a file which is migrated to Tape 1 is necessarily migrated to Tape 2. The second protocol is a method of dynamically creating a set of tapes at a migration timing and storing a file to be migrated at that time on the set of tapes. As a result of the second protocol, file is migrated to Tape 1 and Tape 2, while another file is migrated to Tape 1 and Tape 3.

The embodiments of present invention adopt a case where multiple tapes are used in mirroring-type techniques. When mirroring, the tapes having the same capacity as each other are created in advance and a file is migrated to the set of tapes. In an exemplary embodiment, HSM Manager 140 invokes migration module 125 to perform the operational steps in flowchart 400, where each tape within a set of tapes have the same capacity and a file is migrated to the set of tapes. In this exemplary embodiment, the information regarding the specific location of the tape of written data can be obtained as the attribute information of the file. Specifically, as illustrated in FIG. 4, the file is first written in the tapes by the number of provisionally necessary tapes. Subsequently, the location information (e.g., WRAP and LPOS) on the location in the tape is recorded simultaneously with the recording of the Tape ID.

In step 405, HSM Manager 140 invokes migration module 125 to recognize a file (F(i)). The notation F(i) represents a file which is identical to files 207A-N and 209A-N, where i=1, 2, 3, and so forth. For example, F(i=1), F(i=2), F(i=3), and F(i=4) are each different files from each other. In an exemplary embodiment, F(i=1) has migrated from a primary storage site (e.g., HDD 225) to a secondary storage site (e.g., LTFS 230).

In step 410, HSM Manager 140 invokes migration module 125 to initialize a list S. List S is a data structure identical or similar to structure 215A that resides in a secondary storage site (e.g., LTFS 230). In an exemplary embodiment, list S is designed to contain multiple units of F(i=1) within LTFS 230.

In step 415, HSM Manager 140 invokes migration module 125 to write F(i) onto a tape (T(j)). The notation T(j) represents a tape which is similar or identical to tapes 220A-C, where j=1, 2, 3, and so forth. For example, T(j=1), T(j=2), and T(j=3) are each different tapes. In an exemplary embodiment, migration module 125 sequentially writes F(i=1), F(i=2), and F(i=3) onto T(j=1). Migration module 125 halts the sequential writing operation until the writing direction of the WRAPs changes before and after writing F(i) is started. For example, migration module 125 halts the sequential writing operation of F(i=1), F(i=2), and F(i=3) onto T(j=1) upon migration module 125 determining the writing direction of the WRAPs changed.

In step 420, HSM Manager 140 invokes migration module 125 to add F(i) to list S. In an exemplary embodiment, list S is stored in the memory of migration module 125. F(i), which have been written onto T(j), are contained in list S. For example, migration module 125 stores F(i=1), F(i=2), and F(i=3) in the memory at list S, where F(i=1), F(i=2), and F(i=3) are written onto T(j=1).

In step 425, HSM Manager 140 invokes migration module 125 to determine whether the direction of WRAP changes. In an exemplary embodiment, migration module 125 compares the writing direction of WRAPs before and after the writing of F(i). This determination is made on each tape within the tape library. If migration module 125 determines that the writing direction of WRAPs has changed (i.e., the "YES" branch to step 430), then migration module 125 associates F(i) with a tape (T(k)). If migration module 125 determines that the writing direction of WRAPs has not changed (i.e., the "NO" branch to step 440), then migration module 125 recognizes another file (F(i)), where i=i+1.

In step 430, HSM Manager 140 invokes migration module 125 to recognize another File (F(i)), where i=i+1 upon migration module 125 determining that the writing direction of a WRAP has not changed. In an exemplary embodiment, migration module 125 records data (e.g., a tape ID of F(i), a WRAP of F(i), and a LPOS of F(i)), where a new file is added to F(i). For example, F(i=1), F(i=2), and F(i=3) are files (F(i)), which have been written into T(j=1) and added to List S. F(i=4) is another file subsequently recognized by migration module 125 in addition to F(i=1), F(i=2), and F(i=3) upon migration module 125 determining the writing direction of WRAP has not changed. Furthermore, F(i=4) undergoes step 415, where migration module 125 writes F(i=4) onto T(j=1).

In step 435, HSM Manager 140 invokes migration module 125 to associate F(i) with a tape (T(k)) upon migration module 125 determining that the writing direction of a WRAP has changed. In an exemplary embodiment, migration module 125 records data (e.g., a tape ID, a WRAP, a LPOS, and a change in WRAP directions) as attribute information of F(i)), where T(j) is a different tape than T(k). For example, T(j=1) and T(k=2) are two different tapes. For example, F(i=1), F(i=2), and F(i=3) are files (F(i)), which have been written into T(j=1) and added to List S. F(i=1), F(i=2), and F(i=3) are subsequently associated with T(k=2) upon migration module 125 determining the writing direction of WRAP has changed.

In step 440, HSM Manager 140 invokes migration module 125 to write files in List S (as associated with T(k)). In an exemplary embodiment, F(i), which are the files in List S, are now written to T(k) upon determining the WRAP direction has changed, wherein T(k) is a different tape than T(j) and i=1, 2, and 3. For example, k=2 for T(k) and j=1 for T(j). Therefore, F(i=1), F(i=2), and F(i=3) in List S are written in T(k=2) upon determining the WRAP direction has changed in T(j=1).

In step 445, HSM Manager 140 invokes migration module 125 to determine whether a tape is present in addition to T(j) and T(k). In an exemplary embodiment, migration module 125 knows how many tapes the files should migrate to. The end-user configures HSM, where migration module 125 checks whether other tapes should be migrated, based on the HSM configured by the end-user. T(j) is a distinct tape from T(k), where F(i) is written to T(j=1) and T(k=2). If migration module 125 determines that a tape is not present in addition to T(j) and T(k) (i.e., the "NO" branch to step 455), then migration module 125 creates a stub file. If migration module 125 determines that a tape is present in addition to T(j) and T(k) (i.e., the "YES" branch to step 450), then migration module 125 recognizes another tape (T(k)), where k=k+1.

In step 450, HSM Manager 140 invokes migration module 125 to recognize another tape (T(k)), where k=k+1 upon migration module 125 determining that a tape is present in addition to T(j) and T(k). In an exemplary embodiment, migration module 125 records data (e.g., tape ID of F(i), a WRAP of F(i), and a LPOS of F(i)), where a new tape is added to T(k). For example, F(i=1), F(i=2), and F(i=3) are files (F(i)), which have been initially written into T(j=1); added to List S; and subsequently written into T(k=2). In this example, T(k=3) is another tape subsequently recognized by migration module 125 in addition to T(j=1) and T(k=2) upon migration module 125 determining that a tape is present in addition to T(j=1) and T(k=2). Furthermore, T(k=3) undergoes step 440, where migration module 125 writes F(i) onto T(k=3).

In step 455, HSM Manager 140 invokes migration module 125 to create a stub file upon migration module 125 determining that a tape is not present in addition to T(j) and T(k). In an exemplary embodiment, migration module 125 records data (e.g., a tape ID of F(i), a WRAP of F(i), and a LPOS of F(i)) and the stub file, where the stub file is similar or identical to stub 210. For example, F(i=1), F(i=2), and F(i=3) are files (F(i)), which have been initially written into T(j=1); added to List S; and subsequently written into T(k=2). The stub file is a data structure which resides in the primary storage and allows F(i) to be: (i) completely migrated from primary storage to secondary storage; and (ii) recalled back to primary storage from secondary storage.

In step 460, HSM Manager 140 invokes migration module 125 to compete migration of F(i). In an exemplary embodiment, migration module 125 records data (e.g., a tape ID of F(i), a WRAP of F(i), and a LPOS of F(i)), wherein F(i) migrates completely from primary storage to secondary storage. For example, F(i=1), F(i=2), and F(i=3) are files among F(i), which have been initially written into T(j=1). F(i=1), F(i=2), and F(i=3) are added to List S; subsequently written into T(k=2); and completely migrated from primary storage to secondary storage. If any file among F(i) to be migrated remains after the migration of other F(i) is completed, this writing of the remaining F(i) is repeated upon HSM Manager 140 invoking migration module 125.

In an exemplary embodiment, information regarding the specific location can be realized by obtaining a WRAP and an LPOS via implementing migration module 125 on the tape. The number of files and directories stored in each tape must be obtainable as the extended attribute of the root directory. For example, a file is obtainable when an extended attribute ltfs.<tapeID> of the root directory is read; the total number of files is returned; and the directories stored in a tape having that Tape ID is returned. Migration module 125 stores Tape ID for each file in the extended attribute of the stub file. In turn, the position (WRAP/LPOS) is obtained from LTFS LE (e.g., LTFS 230 from FIG. 2). For example, File 1 among F(i) is migrated to Tape 1 (i.e., T(j)) and Tape 2 (i.e., T(k)) in the primary storage. File 1 is subsequently stubbed. The extended attribute has Tape ID associated with Tape 1 and Tape 2. In the secondary storage (e.g., LTFS 230 in FIG. 2), there are two files in the directory structure, where "/mnt/ltfs" of the directory structure is the mount point of LTFS LE (e.g., LTFS 230 from FIG. 2). The directories of Tape 1 and Tape 2 represent the tapes. The directory name includes TapeID, as indicated below.

| | |
|---|---|
| /mnt/ltfs/Tape1/File1 | (TapeID Directory 1) |
| /mnt/ltfs/Tape2/File1 | (TapeID Directory 2) |

Figure 5:
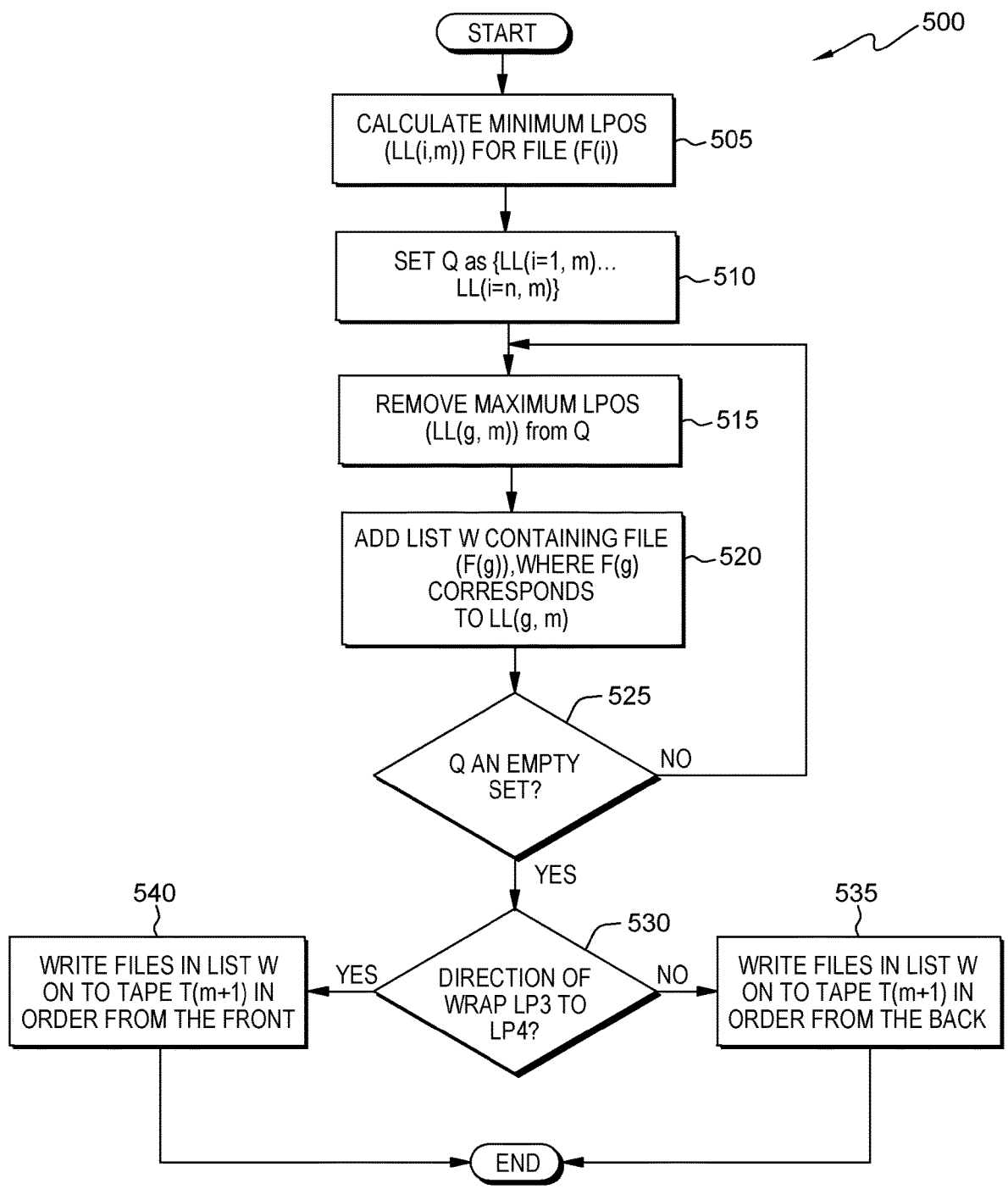
FIG. 5 is a flowchart detailing the operational steps of writing a file, in accordance with an embodiment of the present invention.

FIG. 5 is a flowchart detailing the operational steps of writing files in accordance with an embodiment of the present invention.

FIG. 5 is a more detailed account of step 440 in FIG. 4, where files in List S are written to tape T(m+1). In steps 415, 425, and 430 of FIG. 4, HSM Manager 140 invokes migration module 125 generates LIST S and writes files in List S in a first tape (T(j=1)). When m=1 in step 505, HSM Manager 140 invokes migration module 125 to choose a second tape (T(k=2)) at step 435 of FIG. 4 and writes files in List S at step 440 of FIG. 4. If m=2 in step 505, HSM Manager 140 invokes migration module 125 migrates a file to a third tape (T(k=3)) subsequent to executing the conditional statement at step 445 and writing files in List S at step 440 of FIG. 4. Recall module 127 chooses a file on T(j=1), T(k=2), and T(k=3) to recall.

In this exemplary embodiment, HSM Manager 140 invokes migration module 125 to perform the operational steps in flowchart 500, which can be realized by the expansion of LTFS. In this exemplary embodiment, when a file migrates, the location information in the tape is written to the attribute information of the stub file. Instances where flowchart 500 apply where migration module 125 has: (i) completely written F(i=1, 2, 3, . . . ) to tape (T(m)); (ii) written F(i=1, 2, 3, . . . ) to another tape T (n) is about to start; and (iii) sent F(i=1, 2, 3, . . . ) to List S.

In step 505, HSM Manager 140 invokes migration module 125 to calculate a minimum LPOS (LL(i,m)) for file (F(i)). In an exemplary embodiment, migration module 125 determines L(i,j), which corresponds to a LPOS of record at the head of tape drive where file F(i) is written on tape T(j). The "i" in L(i,j) corresponds to file F(i) and the "j" in L(i,j) corresponds tape T(j). LL(i,m) is the minimum LPOS among L(i,l) to L(i,m). The "i" in LL(i,m) corresponds to file F(i) and "m" in LL(i,m) corresponds to tape T(l) . . . T(m). LL(i,m) is the minimum LPOS that is nearest to LP3 as opposed to LP4. As stated above, recall operations through LP3 are more efficient/faster than recall operations through LP4.

In step 510, HSM Manager 140 invokes migration module 125 to set Q as {LL(i=1, m) . . . LL(i=n,m)}. Q contains: (i) a maximum LPOS (LL(i,m=1)), which is herein denoted as LL(g,m=1); and (ii) a minimum LPOS ((LL(i,m=1)). Furthermore, Q contains the minimum LPOS associated with LP3 to be: (i) inputted into list W; and (ii) write F(i) in list W onto a tape.

In step 515, HSM Manager 140 invokes migration module 125 to remove the maximum LPOS (LL(g,m)) from Q. In an exemplary embodiment, migration module 125 creates List W by reordering the files in List S from FIG. 2. List S is a data structure identical or similar to structure 215A that resides in a secondary storage site (e.g., LTFS 230). Q is a data structure, which is introduced and sorted through. In turn, List S is reordered and furnishes List W. For example, List W should have same order of files as sorted Q.

In step 520, HSM Manager 140 invokes migration module 125 to add List W containing file F(g), where F(g) corresponds to LL(g,m=1). The "g" in F(g) and LL(g,m=1) are associated with a file and the corresponding maximum LPOS, respectively. Migration module 125 creates List W in the memory of migration module 125. The head portions of the respective files F(i=1, 2, g) are successively arranged in List W in order from the file nearest to LP4, even when any one of the tapes on which the files have been written is selected. By performing a migration according as described above, a file among F(i=1, 2, g, . . . ) is located near part of the LP3 which can be found in tapes T(m=1, 2, . . . ). Accordingly, migration module 125 is able to avoid instances, where the file among F(i=1, 2, g, . . . ) is written only near part of the LP4 over tapes T(m=1, 2, . . . ). Thus, recall module 127 takes less time to move the head of a tape drive irrespective of a selected tape for a recall operation.

In step 525, HSM Manager 140 invokes migration module 125 to determine whether Q is an empty set. Migration module 125 aims to remove the maximum LPOS (LL(g, m=1) from Q by sorting through Q and creating List W. If migration module 125 determines Q is an empty set (i.e., the "YES" branch to step 530), then migration module 125 determines the direction of WRAP is LP3 to LP4. If migration module 125 determines Q is not an empty set (i.e., the "NO" branch to step 515), then migration module 125 removes the maximum LPOS (LL(g,m=1)) from Q.

In step 530, HSM Manager 140 invokes migration module 125 to determine whether the direction WRAP (is written from) LP3 to LP4. When the WRAP direction of files (F(i)) is yet to change and F(i) have been written on tape T(m=1), these files are successively written on a second and subsequent tapes T(m=2, 3, . . . ) with the files in list S set to undergo migration. When there is a migration target file, a new list (list W) is prepared during writing on the second and subsequent tapes T(m=2, 3, . . . ). In this situation, writing on tape T(m=1) may be started in parallel. If migration module 125 determines the direction WRAP is written from LP3 to LP4 (i.e., the "YES" branch to step 540), then migration module 125 writes files in list W in order from the front (of the tape drive). If migration module 125 determines the direction WRAP is not written from LP3 to LP4 (i.e., the "NO" branch to step 535), then migration module 125 writes files in list W in order from the back (of the tape drive).

In step 535, HSM Manager 140 invokes migration module 125 to write files in List W onto TAPE T(m+1) in order from the back (of the tape drive) upon migration module 125 determining the direction WRAP is not written from LP3 to LP4. In an exemplary embodiment, List W contains files F(i=1, 2, and 3), where the files are written in the tapes as LP3→F(i=1)→F(i=2)→F(i=3)→LP4. Where the WRAP is directed from LP4 to LP3, the order of writing the files starts with F(i=3), followed by F(i=2), and concluded with F(i=1). In this exemplary embodiment, the files in List W are written onto T(m+1=2).

In step 540, HSM Manager 140 invokes migration module 125 to write files in List W in order from the front (of the tape drive) upon migration module 125 determining the direction WRAP is written from LP3 to LP4. List W contains files, such as F(i=1, 2, 3), to be written onto tapes as LP3→F(i=1)→F(i=2)→F(i=3)→LP4. Where the WRAP is directed from LP3 to LP4, the order of writing the files starts with F(i=1), followed by F(i=2), and concluded with F(i=3). In this exemplary embodiment, the files in List W are written onto T(m+1=2).

HSM Manager 140 invokes migration module 125 to complete writing the files in list W onto another tape T(m+1=2) as described in step 535 and 540. In an exemplary embodiment, migration module 125 begins to write files on T(m=3) after the actual writing on T(m=2) is completed. However, migration module 125 may predict how much LPOS will change when writing on a tape based writing on T(m=1). For example, migration module 125 uses a prediction algorithm (as described above) when a file is written onto a first tape to compare how a LPOS has changed. The prediction algorithm takes into account the position a file is written and the number of units the file has been modified upon writing to another tape. In this example, the file is written onto a first tape from LPOS=10 to LPOS=25. The prediction algorithm used by migration module 125 can now predict that the file will change the LPOS by +15 units when writing the file onto a second tape. Therefore, the parallel processing of calculating LL(i,m=2) is based on the prediction algorithm after writing a file on the first tape.

Figure 6:
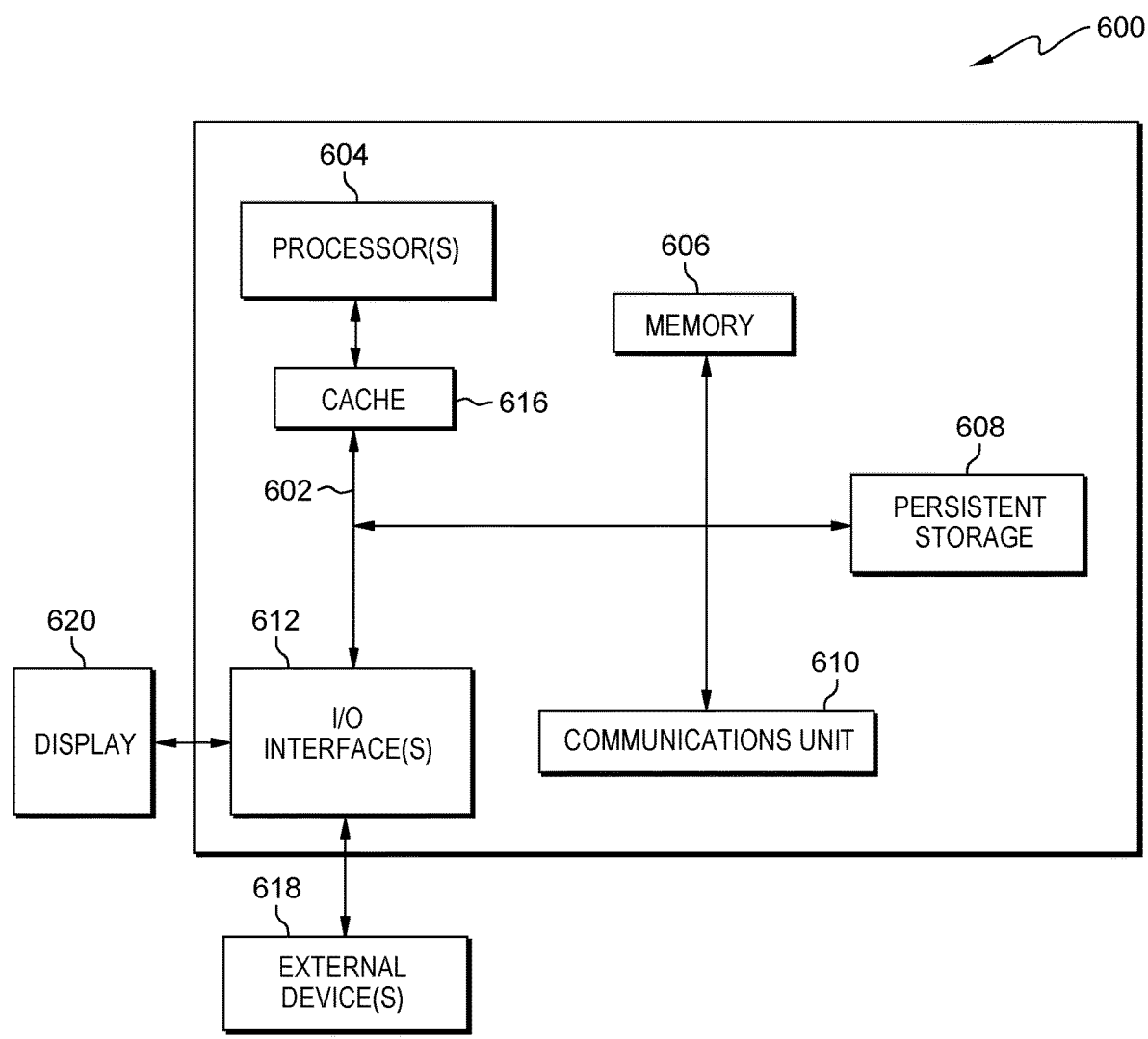
FIG. 6 depicts a block diagram of internal and external components of a computing device, in accordance with an embodiment of the present invention.

FIG. 6 depicts a block diagram of components of a computing device, generally designated 600, in accordance with an illustrative embodiment of the present invention. It should be appreciated that FIG. 6 provides only an illustration of one implementation and does not imply any limitations with regard to the environments in which different embodiments may be implemented. Many modifications to the depicted environment may be made.

Computing device 600 includes communications fabric 602, which provides communications between computer processor(s) 604, memory 606, persistent storage 608, communications unit 610, and input/output (I/O) interface(s) 612. Communications fabric 602 can be implemented with any architecture designed for passing data and/or control information between processors (such as microprocessors, communications and network processors, etc.), system memory, peripheral devices, and any other hardware components within a system. For example, communications fabric 602 can be implemented with one or more buses.

Memory 606 and persistent storage 608 are computer readable storage media. In this embodiment, memory 606 includes random access memory (RAM) 614 and cache memory 616. In general, memory 606 can include any suitable volatile or non-volatile computer readable storage media.

Program instructions and data used to practice embodiments of the present invention may be stored in persistent storage 608 for execution and/or access by one or more of the respective computer processors 604 via one or more memories of memory 606. In this embodiment, persistent storage 608 includes a magnetic hard disk drive. Alternatively, or in addition to a magnetic hard disk drive, persistent storage 608 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 608 may also be removable. For example, a removable hard drive may be used for persistent storage 608. Other examples include optical and magnetic disks, thumb drives, and smart cards that are inserted into a drive for transfer onto another computer readable storage medium that is also part of persistent storage 608.

Communications unit 610, in these examples, provides for communications with other data processing systems or devices. In these examples, communications unit 610 includes one or more network interface cards. Communications unit 610 may provide communications through the use of either or both physical and wireless communications links. Program instructions and data used to practice embodiments of the present invention may be downloaded to persistent storage 608 through communications unit 610.

I/O interface(s) 612 allows for input and output of data with other devices that may be connected to computing device 600. For example, I/O interface 612 may provide a connection to external devices 618 such as a keyboard, keypad, a touch screen, and/or some other suitable input device. External devices 618 can also include portable computer readable storage media such as, for example, thumb drives, portable optical or magnetic disks, and memory cards. Software and data used to practice embodiments of the present invention, e.g., software and data, can be stored on such portable computer readable storage media and can be loaded onto persistent storage 608 via I/O interface(s) 612. I/O interface(s) 612 also connect to a display 620.

Display 620 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience and thus, the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed:

1. A method comprising:
   migrating, by one or more processors, a plurality of files stored in a first storage site to a plurality of tapes in a second storage site in a hierarchical storage system, wherein each tape of the plurality of tapes includes a first position and a second position;
   calculating, by the one or more processors, a recording position of each file of the plurality of files on respective tapes, wherein the recording position is either the first position or the second position of the respective tapes;
   determining, by the one or more processors, a writing order of the plurality of files based on respective recording positions for each file contained on respective tapes and a portion of the plurality of files with sizes exceeding one WRAP; and
   recording, by the one or more processors, each file of the plurality of files on a respective tape of the plurality of tapes based, at least in part, on the writing order.

2. The method of claim 1, further comprising:
   iteratively calculating, by the one or more processors, the respective recording positions of each file of the plurality of files on the respective tapes; and
   iteratively determining, by the one or more processors, the writing order of the plurality of files.

3. The method of claim 1, wherein recording the plurality of files, comprises:
   recording, by one or more processors, the plurality of files until each file among the plurality of files are recorded on at least one tape of the plurality of tapes.

4. The method according to claim 1, wherein migrating the plurality of files, comprises:
   receiving, by one or more processors, a command for migrating the plurality of files; and
   writing, by one or more processors, the plurality of files onto at least a first tape and a second tape of the plurality of tapes.

5. The method of claim 4, wherein writing the plurality of files onto at least the first tape and the second tape, comprises:
   determining, by one or more processors, whether a direction of a WRAP changes during a write operation; and
   specifying, by one or more processors, which files among the plurality of files that have been written onto at least the first tape and the second tape in response to determining the direction of the WRAP changes during the write operation.

6. The method of claim 4, further comprising:
   forming, by the one or more processors, a respective stub file associated with a respective file of the migrated plurality of files.

7. The method of claim 1, further comprising:
   creating, by the one or more processors, a first list containing the writing order;
   reordering, by one or more processors, the first list;
   creating, by the one or more processors, a second list in response to reordering the first list; and
   selectively writing, by the one or more processors, the plurality of files at the first position over the second position among the plurality of tapes.

8. A computer system, the computer system comprising:
   one or more computer processors;
   one or more computer readable storage media; and program instructions stored on the one or more computer readable storage media for execution by at least one of the one or more processors, the program instructions comprising:

program instructions to migrate the plurality of files stored in a first storage site to a plurality of tapes in a second storage site in a hierarchical storage system, wherein each tape of the plurality of tapes includes a first position and a second position;

program instructions to calculate a recording position of each file of the plurality of files on respective tapes, wherein the recording position is either the first position or the second position of the respective tapes;

program instructions to determine a writing order of the plurality of files based on respective recording positions for each file contained on respective tapes and a portion of the plurality of files with sizes exceeding one WRAP; and program instructions to record each file of the plurality of files on a respective tape of the plurality of tapes based, at least in part, on the writing order.

9. The computer system of claim 8, further comprising:
program instructions to iteratively calculate the respective recording positions of each file of the plurality of files on the respective tape; and
program instructions to iteratively determine the writing order of the plurality of files.

10. The computer system of claim 8, wherein program instructions to record the plurality of files, comprise:
program instructions to record the plurality of files until each file among the plurality of files are recorded on at least one tape of plurality of tapes.

11. The computer system of claim 8, wherein program instructions to migrate the plurality of files, comprise:
program instructions to receive a command for migrating the plurality of files; and
program instructions to write the plurality of files onto at least a first tape and a second tape of the plurality of tapes.

12. The computer system of claim 11, wherein program instructions to write the plurality of files onto at least the first tape and the second tape, comprise:
program instructions to determine whether a direction of a WRAP changes during a write operation; and
program instructions to specify which files of the plurality of files have been written in response to determining the direction of the WRAP changes during the write operation.

13. The computer system of claim 8, further comprising:
program instructions to create a first list containing the writing order;
program instructions to reorder the first list;
program instructions to create a second list in response to reordering the first list; and
program instructions to selectively write the plurality of files at the first position over the second position among the plurality of tapes.

14. A computer program product, the computer program product comprising:
a computer readable storage medium and program instructions stored on the computer readable storage medium, the program instructions comprising:

program instructions to migrate the plurality of files stored in a first storage site to a plurality of tapes in a second storage site in a hierarchical storage system, wherein each tape of the plurality of tapes includes a first position and a second position;

program instructions to calculate a recording position of each file of the plurality of files on respective tapes, wherein the recording position is either the first position or the second position of the respective tapes;

program instructions to determine a writing order of the plurality of files based on respective recording positions for each file contained on the respective tapes and a portion of the plurality of files with sizes exceeding one WRAP; and program instructions to record each file of the plurality of files on a respective tape of the plurality of tapes based, at least in part, on the writing order.

15. The computer program product of claim 14, further comprising:
program instructions to iteratively calculate the respective recording positions of each file of the plurality of files on the respective tape; and
program instructions to iteratively determine the writing order of the plurality of files.

16. The computer program product of claim 14, wherein program instructions to record the plurality of files, comprise:
program instructions to record the plurality of files until each file among the plurality of files are recorded on at least one tape of plurality of tapes.

17. The computer program product of claim 14, wherein program instructions to migrate the plurality of files, comprise:
program instructions to receive a command for migrating the plurality of files; and
program instructions to write the plurality of files onto at least a first tape and a second tape of the plurality of tapes.

18. The computer program product of claim 17, wherein program instructions to write the plurality of files onto at least the first tape and the second tape, comprise:
program instructions to determine whether a direction of WRAP changes during a write operation; and
program instructions to specify which files of the plurality of files have been written in response to determining the direction of the WRAP changes during the write operation.

19. The computer program product of claim 17, further comprising:
program instructions to form a respective stub file associated with a respective file of the migrated plurality of files.

20. The computer program product of claim 14, further comprising:
program instructions to create a first list containing the writing order;
program instructions to reorder the first list;
program instructions to create a second list in response to reordering the first list; and
program instructions to selectively write the plurality of files at the first position over the second position among the plurality of tapes.

* * * * *